3,330,745
ELECTROLYTIC PROCESS FOR GRAFT
POLYMERIZATION
Georges Joseph G. Smets, Louvain, Belgium, and Jean Pierre Bex, Fanwood, N.J., assignors to W. R. Grace & Co., New York, N.Y., a corporation of Connecticut
No Drawing. Filed Aug. 11, 1964, Ser. No. 388,931
10 Claims. (Cl. 204—59)

This invention relates to a new process by which certain specific functional groups may be grafted onto polymer acids.

In summary, this invention comprises a method for grafting functional groups onto polymer acids in a solution of a lower monohydric alkanol by electrolyzing said solution containing polymer acid and a mono-carboxylic acid containing two to eighteen carbons, e.g., acetic acid, N-acetylaminocaproic acid, cyanoacetic acid, stearic acid, oleic acid and the like, whereby the carboxylic acid is grafted onto the polymer acid. The term "polymer acid" is well known in the polymer art, and means the polymer resulting from the polymerization of a polymerizable monomer containing a carboxylic acid group. Typical of such acids are polymethacrylic acid, polyacrylic acid, and the like.

It is well known in the art that electrolysis of an acid in aqueous solution effects a decarboxylation of said acid, probably through a free radical mechanism. However, when two or more acids are present in said solutoin, electrolysis creates competition among three different reactions:

(1) $R°_1 + R°_1 \rightarrow R_1 - R_1$
(2) $R°_2 + R°_2 \rightarrow R_2 - R_2$
(3) $R°_1 + R°_2 \rightarrow R_1 - R_2$ wherein $R_1$, and $R_2$ are the free radicals produced respectively from the two different carboxylic acids.

This third reaction has only been observed in concentrated aqueous solutions of the metallic salts of the carboxylic acids, and then only in low yields, unless the reaction is continued over 4 or more days, and under those conditions, the electrolysis of water is an interfering and undesirable reaction.

It has now been found that polymer acids, specifically polymethacrylic acid, can accept grafts in high yields from carboxylic acids, in a methanol solution. The solvent in which the electrolysis takes place is of prime importance. Water, while used frequently for this purpose, has the disadvantage of being electrolyzed into oxygen and hydrogen. The oxygen then combines with any radical in solution to form a hydroperoxide, a very undesirable product. Furthermore, the oxygen shows such a preferential reactivity toward the radicals that it is almost impossible to couple the two radicals themselves.

It was found that methanol was the best solvent for the process of this invention. This is true mainly because it was found that methanol, under electrolysis, does not decompose to an excessive degree under the electrolytic conditions used. The radical which did form, $CH_3O°$, reacted with the macroradical from the polymer acid to form an ether linkage, and thereby methylated the polymer terminally. This reaction therefore did not interfere with the grafting reaction. Other lower monohydric alkyl alcohols such as ethanol, isopropanol, isobutanol and n-butanol are also satisfactory.

However, when using an alcohol as the solvent, one important factor must be considered:

The poor conductivity of the methanol solution of the polymethyacrylic acid necessitated a partial neutralization of the acid; this was accomplished by addition of a solution of sodium methylate to the methanol. The operable rate of neutralization is from 2–10% of the total acidity of the polymer acid and the preferable rate is 5–8%. A higher degree of neutralization, even with the dilute solutions used 1–2% (wt./vol.), excessively increases the viscosity of the solution. This increase in viscosity results in lengthening of the polymer chain caused by the repulsive force of the carboxylic ions, and further causes rapid clogging of the electrode, inhibiting the reaction. On the other hand a lower degree in neutralization does not increase the conductivity of the solution enough to facilitate the electrolysis.

The concentration of the polymer in the solvent is also an important factor to be considered in electrolysis, since high concentration (25% wt./vol.) caused crosslinking by addition of two macroradicals, to the exclusion of any other grafting reactions.

However, viscosity of a polymer solution is very definitely related to concentration, and when the concentration is above 5% (wt./vol.) viscosity is increased to the degree that polymer is deposited on the electrode. Therefore, for operable conditions, it has been determined that conctntration must be under 4–5% (wt./vol.) and preferably 1–2% (wt./vol.) on the basis of monomer in the polymer.

The conditions of the electrolysis comprise another fact of prime concern. These must be such to give a relatively high decarboxylation rate of the polymer (20–80%).

It was determined that a minimum current intensity of about 300 ma.–350 ma. (ma.=milliamperes) was necessary to produce a high enough degree of decarboxylation to be experimentally valuable. A current range of from 100–2000 ma. is operable, but for optimum results, a value about 300–1000 ma. is preferable. Greater values tend to decarboxylate the polymer too quickly, with the result that little control can be exercised over the resulting grafting operation. This current intensity was ascertained for a circular electrode having a diameter of 2.5 centimeters and an area of 4.9 cm.$^2$. Current density in amperes per square centimeter can therefore be easily calculated for this and other different sized electrodes, and the workable amount of current determined for any other size electrode.

The operable voltage range is between 25 to 250 volts, and the preferable range is 50 to 150 volts.

Solution temperature must be kept below the boiling point of the alcohol. Thus, when using methanol, it is preferred to keep the temperature below about 60° C.; however, temperature should not be lower than 10–15° C., since polymer viscosity increases as the temperature decreases. It was found that these factors are minimized at a temperature of 20–25° C., although a 10–60° C. range is operable.

The usual volume of solution electrolyzed in these experiments was 100–150 ml. However, the amount is independent of the process conditions and any desired amount can be used. The time of electrolysis was 1–50 hours.

The choice of the carboxylic acid is dictated by two criteria; the structure of the acid itself, and its compatibility with the polymer solution. First, the structure must be such that decarboxylation is initiated rapidly and has a relatively constant rate thereafter. In other words, the carboxylate group must not be sterically hindered by large substituents on the B-carbon. Secondly, the carboxylic acid should not be reactive with, or destructive to the polymer in any way other than as intended in the electrolysis. Suitable acids are chosen from the group consisting of acetic acid, E-acetylaminocaproic acid, and cyanoacetic acid.

The concentration of the carboxylic acid can be in the 0.2–10.0 ml.$^{-1}$. Higher concentrations increase the possibility of reaction of the two decarboxylated radicals to form the corresponding alkane.

The radicals produced by the acetic acid are the following:

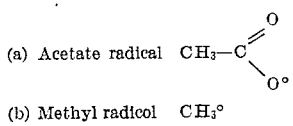

(a) Acetate radical
(b) Methyl radical $CH_3°$ while the macroradicals produced by the polymethacrylic acid have the following structure:

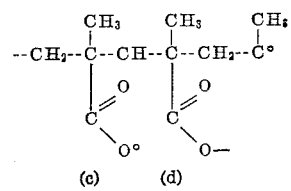

(c)     (d)

These can react together to graft these four groups onto the polymer:

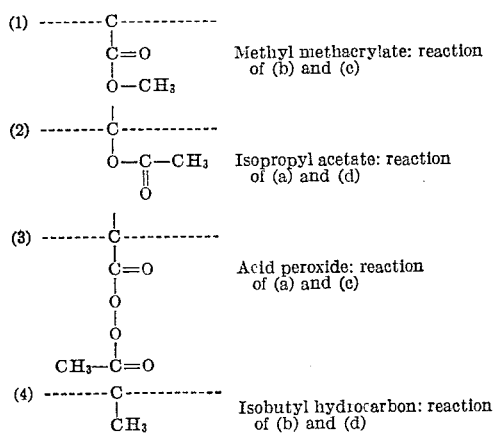

(1) Methyl methacrylate: reaction of (b) and (c)
(2) Isopropyl acetate: reaction of (a) and (d)
(3) Acid peroxide: reaction of (a) and (c)
(4) Isobutyl hydrocarbon: reaction of (b) and (d)

Reaction 3 is very slight, since it is re-electrolyzed to a more simple group as soon as it is formed, especially if the electrolysis is carried on for any appreciable length of time.

The presence of the other 3 groups has been verified by infra-red spectrophotometric techniques, using a Perkin-Elmer Model 21, double beam spectrophotometer. For all IR analyses, 1 mg. of the polymer was dispersed in 200 mg. of KBr.

When the N-acetyl amino caproic acid is electrolyzed, these radicals are formed:

(a) $CH_3-\overset{O}{\overset{\|}{C}}-\overset{H}{\overset{|}{N}}-(CH_2)_4-CH_2°$ (b) $CH_3-\overset{O}{\overset{\|}{C}}-\overset{H}{\overset{|}{N}}-(CH_2)_5-C-O°$ However, according to IR spectrophotometric analysis, the only observable graft formed is:

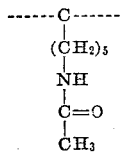

Electrolysis of cyanoacetic acid produces:

(a) $N≡C-CH_2°$
(b) $°N=C=CH_2$

Spectrophotometric analysis indicated that the grafted group was:

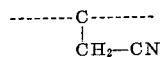

To permit electrolysis at low temperatures and gasometric measurements, the apparatus consisted of four principal parts:

(1) The electrolysis cell was in two Pyrex pieces: a cylindric flask, 20 cm. high and 15 cm. diameter containing the electrolyte; it was covered with a ground glass Pyrex upper part or cover, 10 cm. high and 15 cm. diameter, provided with five holes for: the conductors of the electrodes, a contact thermometer, a connection for gas transmission, and a cooling system (described below) that surrounded the polished platinum electrodes. Continuous stirring of the electrolyte is assured by a magnetic stirrer.

(2) A cooling system, consisting of a pump and refrigerating mixture which permitted the circulation of a cold acetone/water mixture in helical tubing through the electrolytic cell around the electrodes.

(3) An Iron-Hydrogen Stabilized power supply provided currents between 100 and 1000 ma., with a stability constant of ±0.002 ma. This power supply was connected by a relay to the therometer, so that the current was automatically cut if the desired temperature of the solution was exceeded (±0.05°).

(4) An automatic system for gas analysis was used in order to measure the total volume of gases produced, the oxygen content in the gaseous mixture, and the quantity of carbon dioxide evolved, as described by P. E. Toren and B. J. Heinrich, Anal-Chem. 29, 1854 (1957).

The instant invention is illustrated but not limited by the following examples, all in Table I.

The following procedure was used for all the examples: The indicated solution was put into the apparatus described supra, and electrolyzed according to the conditions in Table I. At the end of electrolysis, the current was stopped and the solution poured into a receiving vessel. The polymer was then precipitated by addition of a suitable liquid, i.e., water or diethyl ether, etc.; filtered, dried at 50° C. for 48 hours, and weighed.

The graft percent was determined using various techniques, depending on the carboxylic acid. The acetic acid had been marked with $C_{14}$, and standard scintillation detectors were used to determine the amount of $C_{14}$ using conventional techniques.

The weight of N-acetylamino caproic acid and the cyanoacetic acid groups were determined using the Kjeldahl method of organic nitrogen analysis on samples of the weighed polymer.

| Example No. | Concentration polymethacrylic acid (wt./vol. percent) | Concentration Carboxylic acid (ml.⁻¹) | Percent Neutralization of Methanol solvent | Solution volume, ml. | Current in ma. | Voltage in v. | Time in hours | Temperature in °C. | Percent by weight of grafted functions on polymer |
|---|---|---|---|---|---|---|---|---|---|
| 1 | 1.7 | (Acetic) 9.3 | 2.5 | 100 | 1,000 | 50 | 20 | 20 | 23.0 |
| 2 | 1.7 | do | 1.25 | 100 | 1,000 | 50 | 20 | 20 | 19.1 |
| 3 | 1.7 | (Acetic) 5.1 | 5 | 100 | 1,000 | 50 | 20 | 20 | 16.5 |
| 4 | 1.7 | (N-acetyl-amino caproic) 0.8 | 5 | 100 | 300 | 50 | 28 | 20 | 17.6 |
| 5 | 1.7 | (N-acetyl-amino caproic) 1.2 | 5 | 100 | 300 | 50 | 40 | 20 | 17.4 |
| 6 | 1.7 | (Cyanoacetic) 2.0 | 5 | 100 | 400 | 50 | 20 | 20 | 13.6 |
| 7 | 1.7 | (Cyanoacetic) 4.0 | 5 | 100 | 400 | 50 | 20 | 40 | 15.4 |

*Discussion of Table I*

When comparing Examples 1, 2, 3 it will be noted that Example 3, while having an initial acetic acid concentration of about half of the other examples, yields more graft percent than would be predicted. This is due to the greater degree of neutralization in Example 3. Although neutralization is not necessary in such an acid solution to support a current, the function of neutralization is also to ionize the polymer acid groups, to facilitate decarboxylation and subsequent reaction. Hence, the optimum range of 5–8% neutralization, even when the carboxylic acid is considerably ionized. This procedure (high concentration of carboxylic acid, high current, short time) is effective when the acid is not too likely to decompose under electrolysis, i.e., lower alkyl acids, or acid without many branched substituents.

Examples 4 and 5 illustrate an alternate procedure: The use of a lower carboxylic concentration, and a lower current density, but an increased electrolysis time. This is preferable when the carboxylic acid used has a tendency to decompose when subjected to strong currents. Acids in this group are those with a chain substituent, such as $C=O$, $NH_2$, etc., which may oxidize and cause chain scission.

Examples 6 and 7 also illustrate less extreme conditions of electrolysis.

What is claimed is:

1. The process for grafting functional groups onto polymer acids in an alcoholic solution, by electrolyzing said solution containing polymer acid and a monocarboxylic acid whereby the carboxylic acid is grafted onto the polymer acid.

2. The process in claim 1, in which the polymer acid is polymethacrylic acid.

3. The process in claim 1, in which the polymer acid is present in a concentration of 1–2% (weight/volume).

4. The process in claim 1, in which the carboxylic acid concentration is 0.2–10.

5. The process in claim 1, in which the alcoholic solvent is chosen from the group consisting of lower alkyl alcohols.

6. The process in claim 1, in which the alcoholic solvent is methanol.

7. The process in claim 6, in which the electrolytic conditions are 0.1 to 2 amperes, 25 to 250 volts, 1 to 50 hours duration at 10° to 60° C.

8. The process in claim 1, in which the monocarboxylic acid is acetic acid.

9. The process in claim 1, in which the monocarboxylic acid is N-acetylaminocaproic acid.

10. The process in claim 1, in which the monocarboxylic acid is cyanoacetic acid.

References Cited

UNITED STATES PATENTS

| | | | |
|---|---|---|---|
| 2,760,926 | 8/1956 | Kronenthal | 204—59 |
| 2,961,384 | 11/1960 | McKinney et al. | 204—14 |
| 3,140,276 | 7/1964 | Forster | 204—72 |

JOHN H. MACK, *Primary Examiner.*

HOWARD S. WILLIAMS, *Examiner.*